(12) United States Patent
Buchanan et al.

(10) Patent No.: US 7,195,348 B2
(45) Date of Patent: Mar. 27, 2007

(54) LASER WELDED INKJET PRINTHEADS HAVING NON-UNIFORMLY THICK PRINTHEAD LIDS

(75) Inventors: Jeffery J. Buchanan, Lexington, KY (US); Jeanne Marie Saldanha Singh, Lexington, KY (US); Ganesh Vinayak Phatak, Lexington, KY (US); Kin Ming Kwan, Lexington, KY (US)

(73) Assignee: Lexmark International, Inc., Lexington, KY (US)

( * ) Notice: Subject to any disclaimer, the term of this patent is extended or adjusted under 35 U.S.C. 154(b) by 510 days.

(21) Appl. No.: 10/850,175

(22) Filed: May 20, 2004

(65) Prior Publication Data

US 2004/0212659 A1 Oct. 28, 2004

Related U.S. Application Data

(62) Division of application No. 10/279,389, filed on Oct. 24, 2002, now Pat. No. 6,841,024.

(51) Int. Cl.
*B41J 2/175* (2006.01)

(52) U.S. Cl. ...................................................... 347/87

(58) Field of Classification Search ..................... None
See application file for complete search history.

(56) References Cited

U.S. PATENT DOCUMENTS

| 6,276,785 B1 * | 8/2001 | Shinada et al. ................ 347/86 |
| 6,390,578 B1 * | 5/2002 | Koitabashi et al. ............ 347/7 |
| 6,486,433 B2 | 11/2002 | Grewell et al. |

* cited by examiner

*Primary Examiner*—Thinh Nguyen
(74) *Attorney, Agent, or Firm*—King & Schickli, PLLC

(57) ABSTRACT

In a system for laser welding upper and lower work pieces along a weld interface, the upper work piece being transparent to laser light and having a non-uniformly thick dimension, compensation plates and compliant members are taught that mate or otherwise contact the upper work piece such that a combined thickness of the upper work piece and the compensation plate or compliant member is substantially uniform in a region at least above the weld interface. In this manner, substantially consistent amounts of laser light reach the weld interface. The upper work piece may include positive projections, negative voids, contoured profiles, surface imperfections or other that cause the non-uniformity. In one embodiment, the compensation plate is fashioned together with a compliant member. In another embodiment, the upper and lower work pieces comprise inkjet printhead lids and bodies, respectively.

18 Claims, 7 Drawing Sheets

LASER WELDED INKJET PRINTHEADS HAVING NON-UNIFORMLY THICK PRINTHEAD LIDS

This is a divisional application of U.S. patent application Ser. No. 10/279,389 filed on Oct. 24, 2002 now U.S. Pat. No. 6,841,024, entitled Compensation Plates and Compliant Members for Laser Welding a Non-Uniformly Thick Work Piece Including Inkjet Printheads with Non-Uniformly Thick Printhead Lids.

FIELD OF THE INVENTION

The present invention relates to laser welding first and second work pieces. In particular, it relates to forming substantially uniform weld joints along a weld interface between the work pieces when one of the work pieces has a non-uniformly thick cross section or dimension. Even more particularly, a compensation plate and/or compliant member mates with or otherwise contacts the non-uniformly thick work piece during laser welding to resist the adverse affects normally caused by welding a non-uniformly thick work piece. The first and second work pieces may comprise inkjet printhead lids and bodies.

BACKGROUND OF THE INVENTION

The art of laser welding is relatively well known. In general, with reference to FIG. 1A, first and second work pieces, embodied as an upper work piece 100 laid on a lower work piece 120 along a weld interface 180, become welded to one another by way of an irradiated beam 140 of laser light. As is known, the beam 140 passes through the upper work piece, which is transparent to laser light, where it gets absorbed by the lower work piece, which is laser light absorbent. As the beam irradiates, the weld interface heats up and causes the bottom surface of the upper work piece and the upper surface of the lower work piece to melt. Upon cooling, the two work pieces meld together. An optical path between a laser light source (not shown) and the to-be-welded work pieces may include a lens 160, for proper focusing, or other optical elements, such as mirrors, fiber optic strands, scanning structures. A clamping device (not shown) typically provides a pressing engagement of the work pieces to maintain relative positioning and good surface contact during welding.

In instances when the upper work piece prevents sufficient amounts of laser light from arriving at the weld interface, poor welding (underweld) results. In instances when the upper work piece absorbs too much energy, the upper work piece often overheats and/or suffers material degradation which potentially causes aesthetic problems as well as unsatisfactory welds. Numerous parameters contribute to the absorption and transmission characteristics of materials including, but not limited to, laser wavelength, incident angle of the laser beam, surface roughness of the work piece, temperature of the work pieces, thickness/dimensions of the work piece, composition of the work piece and, in the instance when the work pieces comprise plastics, additives such as flame retardants, plasticizers, fillers and colorants.

Yet, when the material properties and laser properties become fixed in a given system, the transmission rate of the laser through a work piece follows the well known Beer-Lambert Law, specifically: $I/Io = e^{(-sx)}$; where Io is the intensity of the light source incident on the work piece, I is the intensity of the light after passing through the work piece, x is the thickness of the work piece, and s is the total extinction coefficient which, in turn, is the work piece light scattering coefficient plus the work piece light absorption coefficient. Accordingly, the thickness of the work piece (variable x) constitutes an important variable in light transmission rates.

As is apparent in FIG. 1A, the upper work piece 100 comprises a generally uniformly thick material. Thus, laser light will transit the work piece in area A at substantially equivalent rates as compared to area B, or any other area of the work piece, which will likely result in generally uniform weld joint along the weld interface.

With reference to FIG. 1B, however, sometimes the upper work piece 200 does not embody a uniformly thick structure and laser light transmission rates will not compare favorably between regions 220, 222 and 224, for example, resulting in a weld joint at the weld interface 180 that likely lacks uniformity in thickness and/or strength. It may even lead to compromised structural integrity.

Present solutions to overcome this problem, in the instance of a sweeping laser in contour welding, include moving the laser slower in relatively thicker regions 220 or faster in relatively thinner regions 224 or, in the instance of simultaneous welding, increasing the laser power in thick regions 220 or decreasing laser power in thin regions 224. Both of these approaches, however, lack practicality. For example, a sweeping laser suffers from inertia effects during periods of acceleration and deceleration and a variable laser power requires additional laser controllers which add complexity and cost.

Accordingly, a need exists in the laser welding arts for economically and efficaciously laser welding two work pieces even when one of the to-be-welded work pieces embodies a non-uniformly thick dimension.

Regarding the technology of inkjet printing, it too is relatively well known. In general, an image is produced by emitting ink drops from an inkjet printhead at precise moments such that they impact a print medium, such as a sheet of paper, at a desired location. The printhead is supported by a movable print carriage within a device, such as an inkjet printer, and is caused to reciprocate relative to an advancing print medium and emit ink drops at such times pursuant to commands of a microprocessor or other controller. The timing of the ink drop emissions corresponds to a pattern of pixels of the image being printed. Other than printers, familiar devices incorporating inkjet technology include fax machines, all-in-ones, photo printers, and graphics plotters, to name a few.

A conventional thermal inkjet printhead includes access to a local or remote supply of color or mono ink, a heater chip, a nozzle or orifice plate attached to the heater chip, and an input/output connector, such as a tape automated bond (TAB) circuit, for electrically connecting the heater chip to the printer during use. The heater chip, in turn, typically includes a plurality of thin film resistors or heaters fabricated by deposition, masking and etching techniques on a substrate such as silicon.

To print or emit a single drop of ink, an individual heater is uniquely addressed with a small amount of current to rapidly heat a small volume of ink. This causes the ink to vaporize in a local ink chamber (between the heater and nozzle plate) and be ejected through and projected by the nozzle plate towards the print medium.

During manufacturing of the printheads, a printhead body gets stuffed with a back pressure device, such as a foam insert, and saturated with mono or color ink. A lid welds to the body via ultrasonic vibration. This, however, has sometimes caused cracks in the heater chip, introduced and entrained air bubbles in the ink and compromised overall printhead integrity.

Even further, as demands for higher resolution and increased printing speed continue, heater chips are often engineered with more complex and denser heater configurations which raises printhead costs. Thus, as printheads evolve a need exists to control overall costs, despite increasing heater chip costs, and to reliably and consistently manufacture a printhead without causing cracking of the ever valuable heater chip.

SUMMARY OF THE INVENTION

The above-mentioned and other problems become solved by applying the apparatus and method principles and teachings associated with the hereinafter described compensation plates and compliant members for laser welding work pieces having at least one non-uniformly thick work piece.

In one embodiment, a laser welds upper and lower work pieces along a weld interface. The upper work piece is transparent to laser light and has a non-uniformly thick dimension. The lower work piece absorbs laser light. Compensation plates or compliant members mate or otherwise contact the upper work piece such that a combined thickness of the upper work piece and the compensation plate or compliant member renders a region, at least above the weld interface, substantially uniformly thick. In this manner, substantially consistent amounts of laser light reach the weld interface, regardless of the otherwise non-uniformity of light transmission rates through the upper work piece, which creates substantially uniformly thick and strong weld joints. In another embodiment, the compensation plate becomes fashioned with a compliant member. The upper work piece may include positive projections, negative voids, contoured profiles, surface imperfections or other that cause the non-uniformity.

Inkjet printhead lids and bodies, laser welded together with compensation plates and/or compliant members, and printers containing the printheads are also disclosed.

These and other embodiments, aspects, advantages, and features of the present invention will be set forth in the description which follows, and in part will become apparent to those of ordinary skill in the art by reference to the following description of the invention and referenced drawings or by practice of the invention. The aspects, advantages, and features of the invention are realized and attained by means of the instrumentalities, procedures, and combinations particularly pointed out in the appended claims.

DETAILED DESCRIPTION OF THE PREFERRED EMBODIMENTS

In the following detailed description of the preferred embodiments, reference is made to the accompanying drawings that form a part hereof, and in which is shown by way of illustration, specific embodiments in which the inventions may be practiced. These embodiments are described in sufficient detail to enable those skilled in the art to practice the invention, and it is to be understood that other embodiments may be utilized and that process or other changes may be made without departing from the scope of the present invention. The following detailed description is, therefore, not to be taken in a limiting sense, and the scope of the present invention is defined only by the appended claims and their equivalents.

In accordance with the present invention, we hereinafter describe a compensation plate and/or a compliant member that, during laser welding of first and second work pieces, essentially eliminate the prior art problems of poor weld joint thickness and/or strength despite one of the to-be-welded work pieces embodying a non-uniformly thick dimension.

Figure 1A:
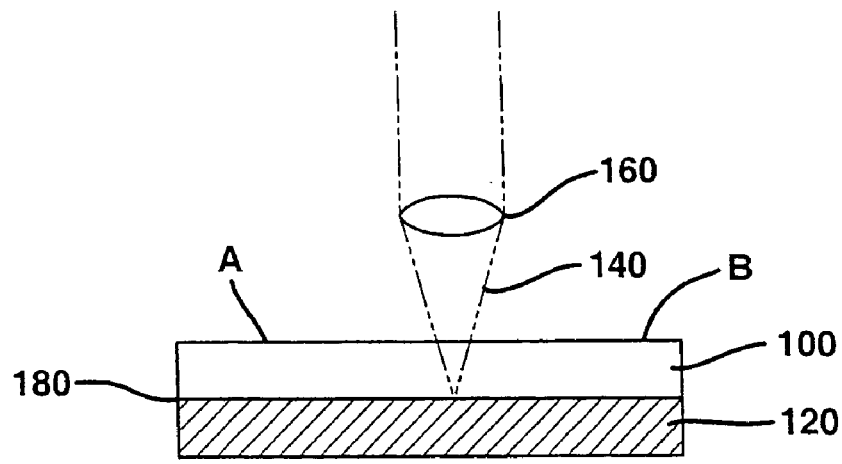
FIG. 1A is a diagrammatic view in accordance with the prior art of a uniformly thick upper work piece being laser welded to a lower work piece.
Figure 1B:
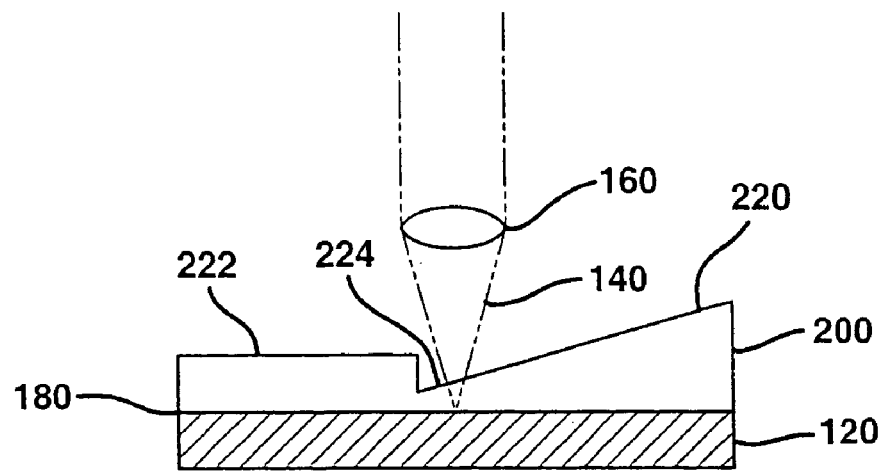
FIG. 1B is a diagrammatic view in accordance with the prior art of a non-uniformly thick upper work piece being laser welded to a lower work piece.
Figure 2:
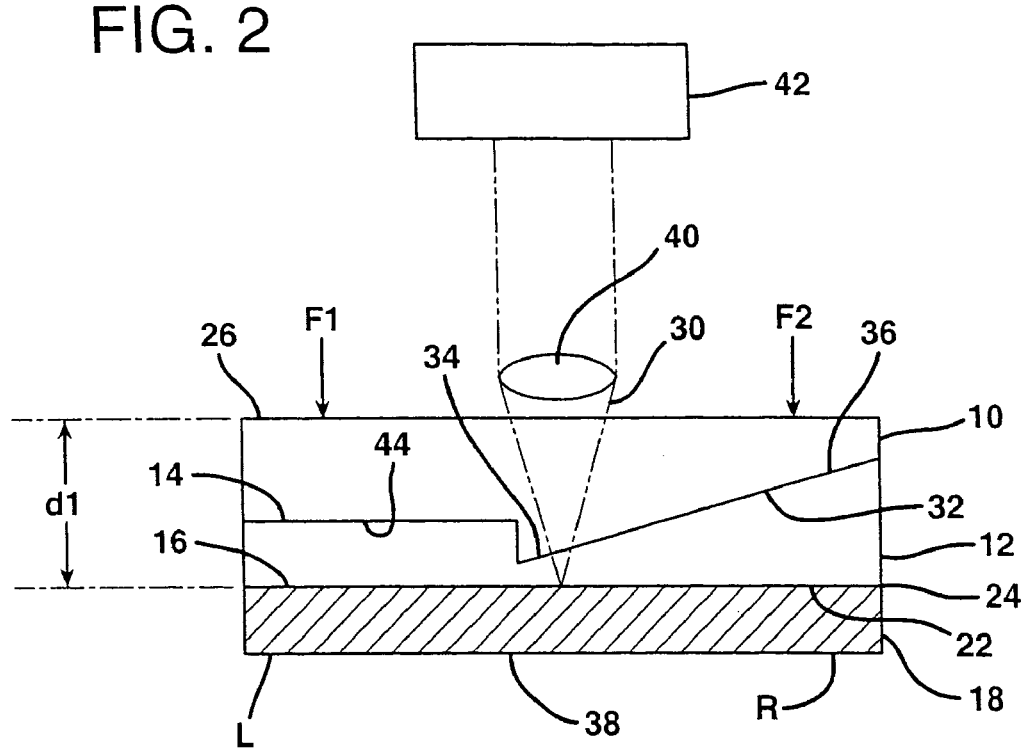
FIG. 2 is a diagrammatic view in accordance with the teachings of the present invention of a compensation plate for use in laser welding a non-uniformly thick upper work piece to a lower work piece.

In FIG. 2, an upper to-be-welded work piece 12 having a non-uniformly thick cross section, between an upper surface 14 and a lower surface 16, lays on a lower work piece 18. An upper surface 22 of the lower work piece together with the lower surface of the upper work piece forms a weld interface 24 along which the two work pieces will become joined.

The compensation plate 10 mates or otherwise contacts the upper work piece such that a combined thickness d1 of the compensation plate and upper work piece becomes substantially uniformly thick from between the lower surface 16 of the upper work piece and a top surface 26 of the compensation plate. In this manner, when laser welding the two work pieces with a beam 30, the distance the laser light travels from the top surface 26 of the compensation plate to the weld interface 24 is substantially uniform thereby delivering substantially consistent amounts of laser light to the weld interface and yielding a substantially uniformly thick weld joint having a substantially uniform weld strength.

In addition, in the event the beam 30 becomes swept across the work pieces from a left region L to a right region R, no longer does a need exist to accelerate/decelerate the beam to compensate for an otherwise non-uniformly thick upper work piece and the problems of inertia effects and implementing precision sweep timing is avoided. In the event the welding consists of a simultaneous weld, laser power need not have special controllers for directing a low laser power beam through relatively thin regions 34 and a high laser power beam through relatively thick regions 36 of the upper work piece.

As shown, the bottom surface 32 of the compensation plate and the upper surface 14 of the upper work piece each have complimentarily contoured surfaces that together form a junction 44. Those skilled in the art should appreciate that in the event minute interstitial spaces exist in the junction, likely caused by surface imperfections of the compensation plate and/or upper work piece, that the beam may adversely deflect, reflect, bend or other. Thus, this invention further contemplates a junction 44 that substantially lacks any interstitial spaces. In some high precision applications, this invention contemplates polishing or otherwise providing chemical or other processing to the bottom surface 32 of the compensation plate and/or upper surface 14 of the upper work piece to eliminate even the slightest of interstitial spaces. Still further, this invention contemplates the addition of filler materials between the bottom of the compensation plate and the upper surface of the upper work piece to fill interstitial spaces.

Regarding compositions, in order to substantially prevent light beam deflection or other optical anomalies at the junction 44, the invention still further contemplates that the compensation plate and the upper work piece could have substantially similar optical properties, such as indices of refraction and rates of light transmission, chemical compositions and material properties. In one embodiment, the upper work piece and compensation plate comprise plastic compositions, with the upper work piece having a composition of polyphenylene ether plus polystyrene and the compensation plate having a composition affording substantially similar optical properties.

A clamping device, a pressing member or other (not shown) may be utilized to supply a pressing engagement between the work pieces during welding as indicated by force lines F1 and F2. Other forces, not shown, likely oppose force lines F1, F2 from underneath and normal to a lower surface 38 of the lower work piece 18 when the lower surface 38 rests on a platform, for example, during welding.

We depict a lens 40 for focusing the beam 30 during welding but those skilled in the art should appreciate that we greatly simplified the optical path and it may additionally include other optical structures such as mirrors, fiber optic strands, laser scanning devices (e.g., rotating multi-faceted mirrors), other lenses or other. Preferably, the laser beam originates from a laser source 42 such as a laser diode. In one embodiment, the laser source represents an 810 nm wavelength aluminum gallium arsenide (AlGaAs) semiconductor laser having a laser power of about 50 watts. Other embodiments include, but are not limited to, other types of continuous wave lasers with similar power intensity such as semiconductor lasers based on Indium Gallium Arsenide (InGaAs) with wavelengths 940–990 nm and Aluminum Gallium Indium Phosphide (AlGaInP) with wavelengths 630–680 nm, solid state lasers such as lamp pumped Neodymium-doped Yttrium Aluminum Garnet (Nd:YAG) with wavelength 1064 nm and diode pumped Neodymium-doped Yttrium Aluminum Garnet (Nd:YAG) with wavelength 1064 nm or other.

As expected, the compensation plate and upper work piece embody a laser light transparent material while the lower work piece embodies a laser light absorbent material. The transparency or opaqueness of theses structures, however, does not mean that 100% laser light gets transmitted or blocked. The transparency and opacity is only required to allow enough light to transit the compensation plate and upper work piece and get absorbed by the lower work piece to form an appropriate laser weld.

It should be further appreciated that while the work pieces have a weld interface depicted as substantially coextensive, either or both of the work pieces may have portions that extend beyond a periphery of the other. Thus, the compensation plate need only compensate for non-uniformly thick work pieces in a to-be-welded region substantially adjacent the weld interface. Still further, the work pieces can become arranged with a weld interface in ways other than an upper and lower configuration, such as side-by-side, end-to-end, etc., provided one of the work pieces has a non-uniformly thick dimension that can become rendered substantially uniformly thick by contacting or otherwise mating with a compensation plate.

Figure 3:
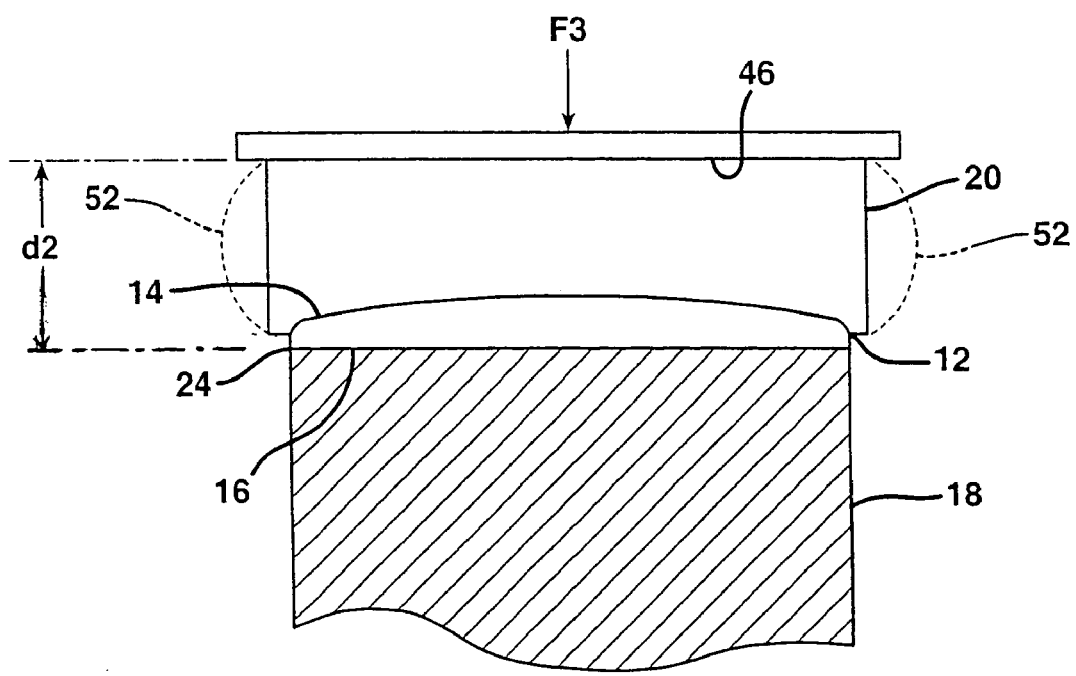
FIG. 3 is a diagrammatic view in accordance with the teachings of the present invention of a compliant member for use in laser welding a non-uniformly thick upper work piece to a lower work piece.

In FIG. 3, a compliant member 20 replaces the compensation plate of FIG. 2 in rendering the non-uniformly thick upper work piece 12 substantially uniformly thick in combination with the compliant member (combined thickness d2) as between a lower surface 16 of the upper work piece and a top surface 46 of the compliant member. In this embodiment, a pressing member 48 compresses the compliant member (indicated by force line F3) between itself and the upper surface 14 of the upper work piece in an area substantially above the weld interface 24. Depending upon the material properties of the compliant member, various portions thereof may deform, such as by bowing outward indicated by the dashed lines 52. As with the compensation plate, the compliant member is preferably made from a laser light transparent material. In one embodiment, the compliant member comprises a silicone elastomer. Other embodiments could include, but are not limited to, polyurethanes, styrene block copolymers, polyethylenes, or other.

Although not shown, those skilled in the art should appreciate a laser welding system, including a laser light source and optical path, is present to weld the upper and lower work pieces to one another.

Figure 4:
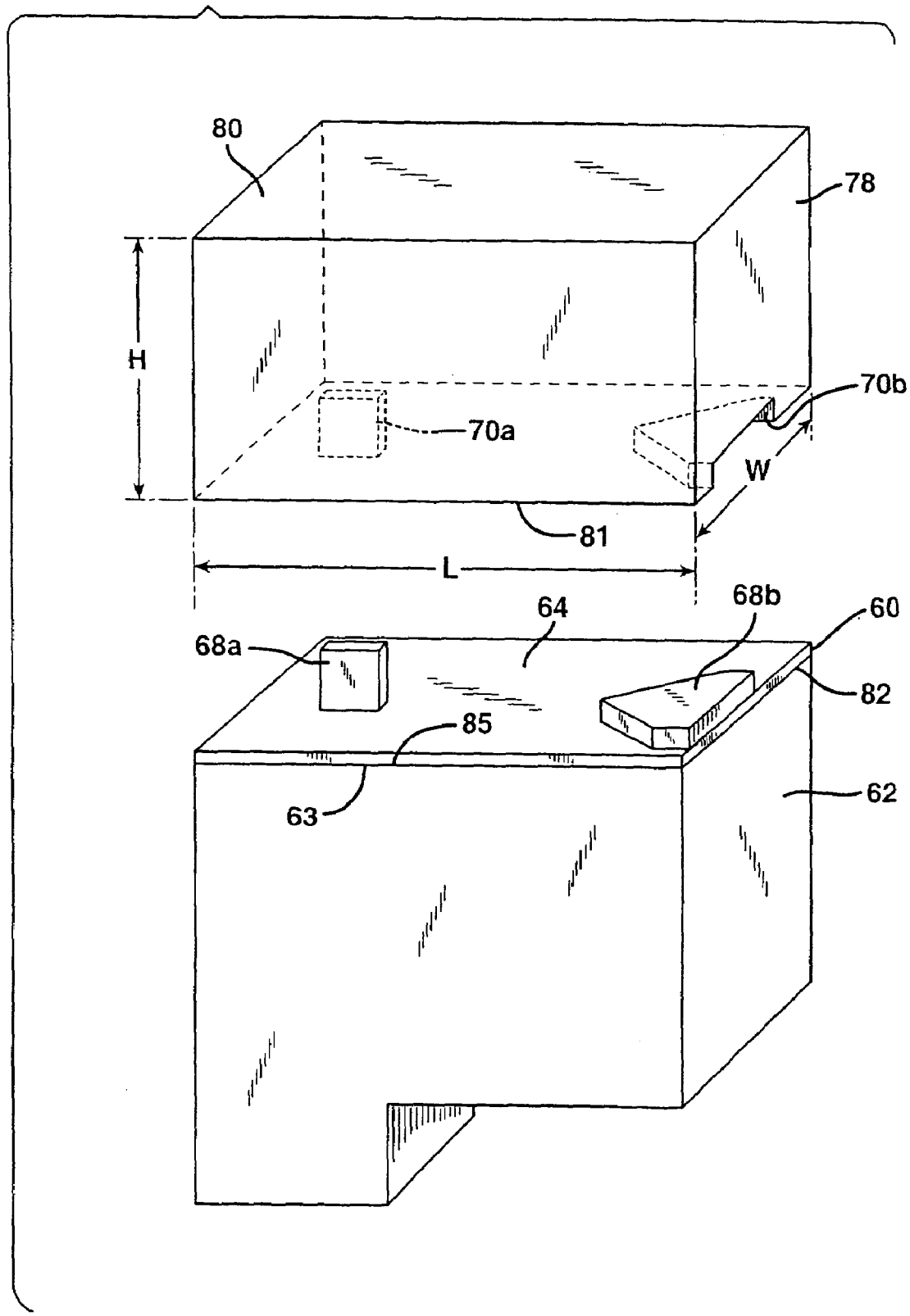
FIG. 4 is a perspective view in accordance with the teachings of the present invention of a compensation plate for use in laser welding a non-uniformly thick upper work piece of an inkjet printhead to a lower work piece of an inkjet printhead.

In FIG. 4, the first and second to-be-welded work pieces embody an inkjet printhead lid 60 and an inkjet printhead body 62. The lid has a non-uniformly thick upper surface 64 caused by a plurality of positive projections opposite a weld interface 82 in the form of two keying structures 68*a*, 68*b* useful in marrying specific inkjet printheads into cartridge carriers in a specific inkjet printer.

During laser welding, a compensation plate 78 having negative voids 70*a*, 70*b* complimentarily configured to mate and/or interlock with positive projections 68*a*, 68*b*, respectively, becomes positioned to rest a bottom surface 81 thereof on portions of the upper surface 64 not having positive projections to thereby render a combined thickness (from a lower surface 63 of the lid 60 to a top surface 80 of the compensation plate 78) substantially uniform. As before, such substantially uniform combined thickness lends itself to substantially consistent amounts of laser light reaching the weld interface and, in turn, a weld joint along weld interface 82 (formed by the contact between the lower surface 63 of the lid and a top surface 85 of the inkjet printhead body 62) that exists in a substantially uniformly thick dimension and has a substantially uniform strength over the entirety of the weld interface.

In one preferred embodiment, the lid comprises a laser transparent material having a composition of polyphenylene ether plus polystyrene while the body comprises a laser absorbing material also having a composition of polyphenylene ether plus polystyrene. The compensation plate preferably has a composition affording optical properties similar to the lid.

The compensation plate has length L, width W and height H dimensions that can vary from application to application. As shown, the length and width dimensions substantially equate to a length and width of the lid 60 while the height has a dimension selected as a function of various parameters relating, among other things, to laser light transmission rate.

Figure 5:
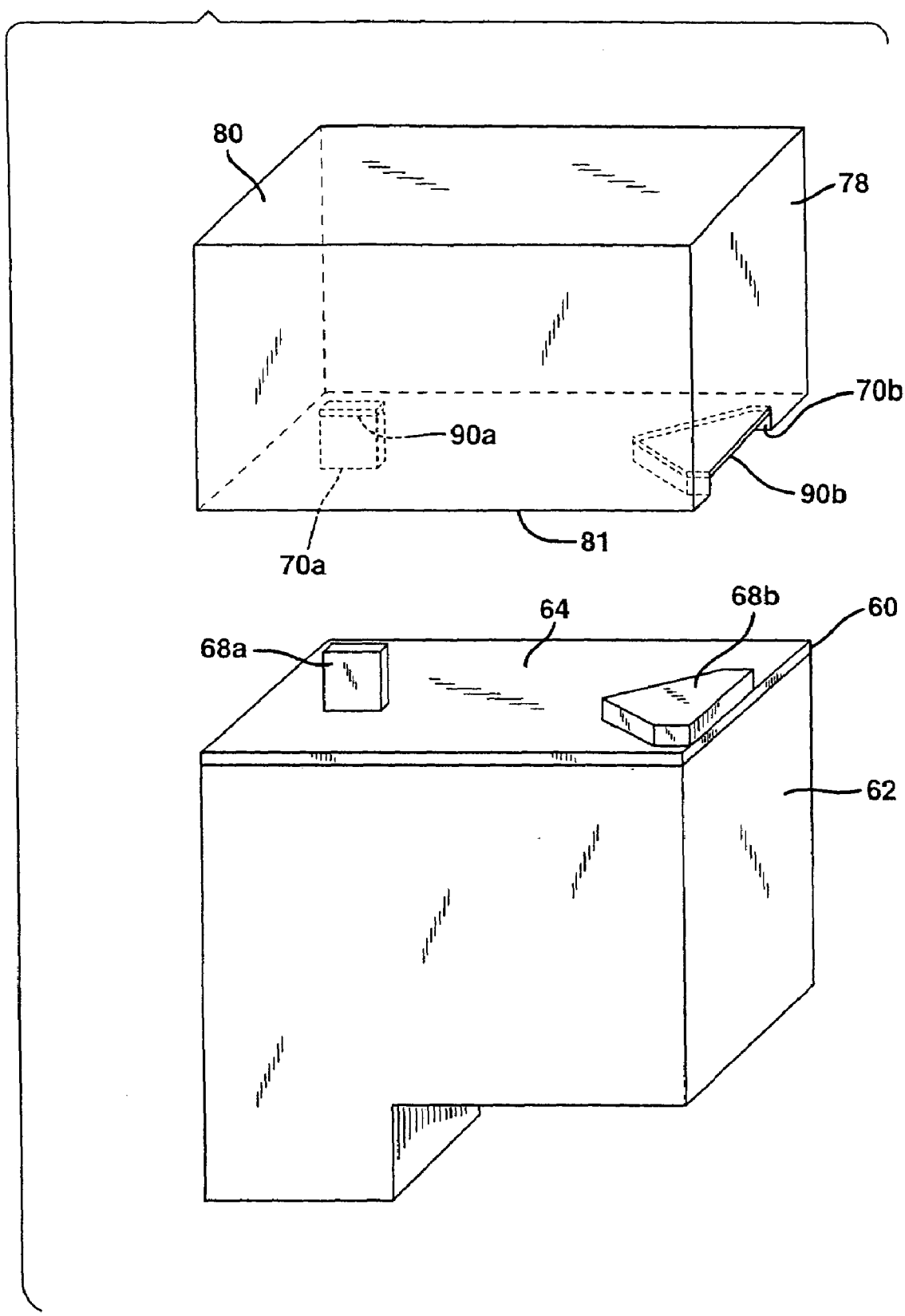
FIG. 5 is a perspective view in accordance with the teachings of the present invention of a compensation plate having a compliant member for use in laser welding a non-uniformly thick upper work piece of an inkjet printhead to a lower work piece of an inkjet printhead.

FIG. 5 differs from FIG. 4 in that the negative voids 70a, 70b that mate with the positive projections 68a, 68b further comprise compliant members 90a, 90b in a top thereof to further enhance and ensure the complimentary mating of the projections to the voids without the presence of interstitial spaces.

While FIGS. 4 and 5 show the inkjet printhead lid 60 as having the positive projections 68 and the compensation plate 78 as having the negative voids 70, those skilled in the art should appreciate that the lid could have the voids while the compensation plate has the projections or that either could have both.

Figure 6:
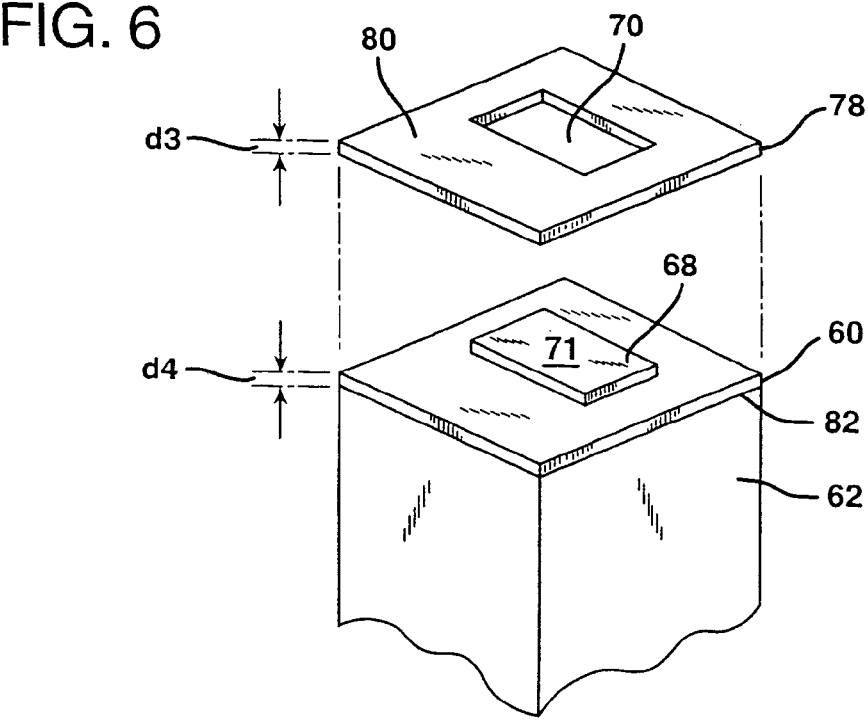
FIG. 6 is a perspective view in accordance with the teachings of the present invention of a compensation plate for use in laser welding a non-uniformly thick upper work piece of an inkjet printhead to a lower work piece of an inkjet printhead.

In FIG. 6, although the combined thickness of the compensation plate and the lid (d3+d4) remains substantially uniform above the weld interface 82, the compensation plate 78 differs from previous embodiments because a top 71 of the positive projection coplanarly exists with a top 80 of the compensation plate when the lid and compensation plate interlock or mate.

As before, either the lid or the compensation plate can have negative voids, positive projections or both and the compensation plate can become further fashioned with a compliant member.

Figure 7:
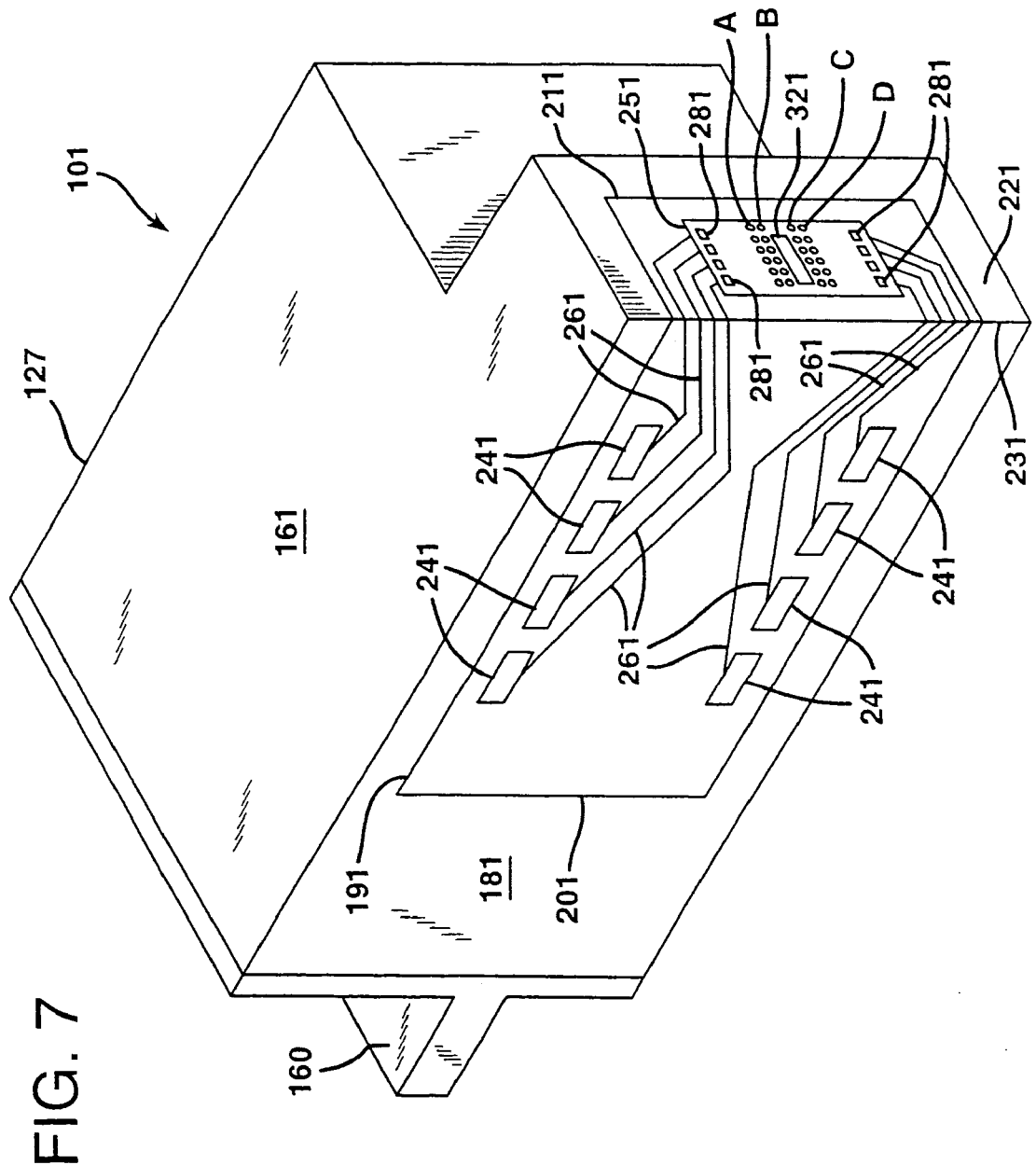
FIG. 7 is a perspective view in accordance with the teachings of the present invention of an inkjet printhead having a non-uniformly thick lid laser welded with use of one of a compensation plate or compliant member.
Figure 8:
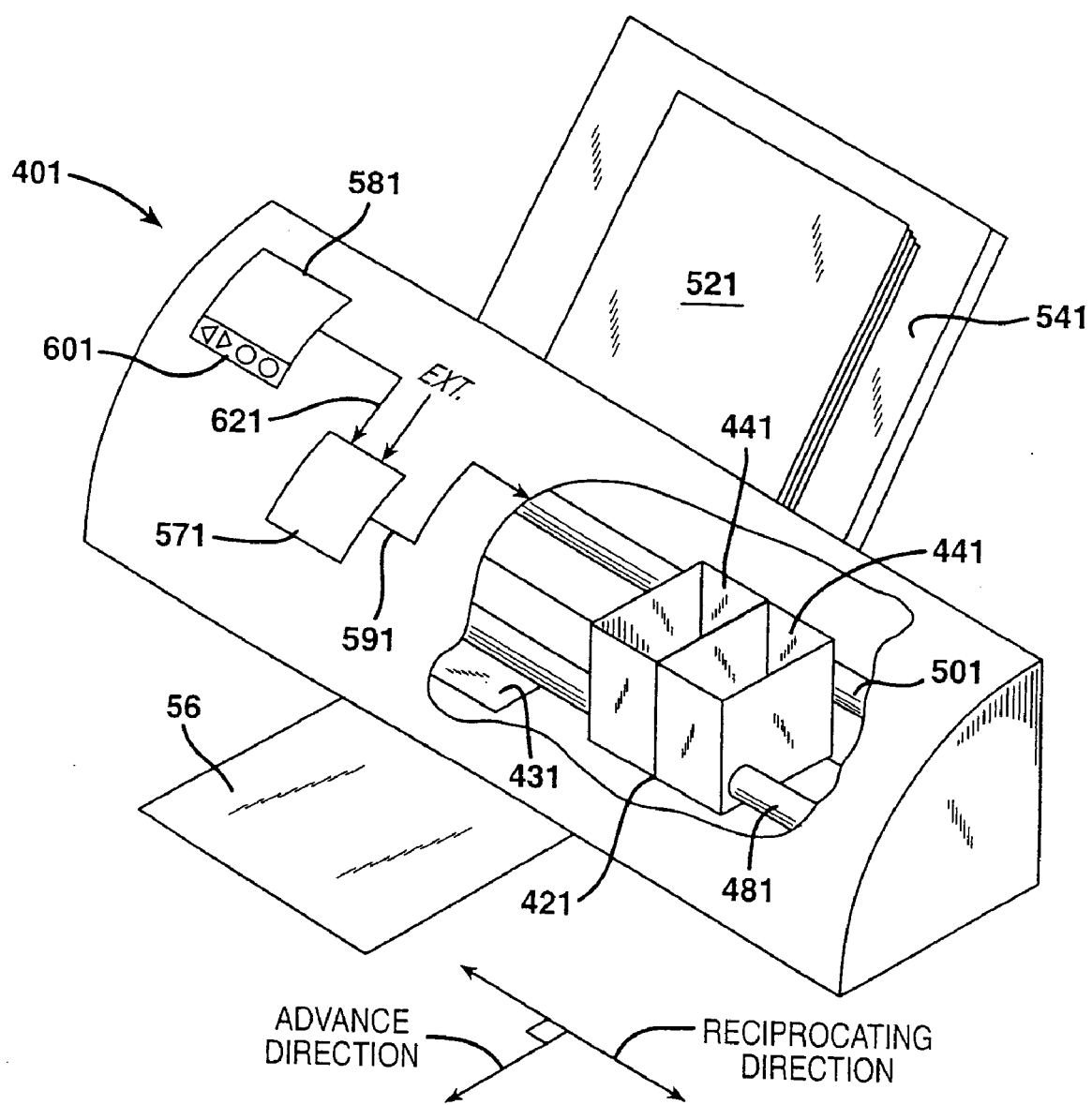
FIG. 8 is a perspective view in accordance with the teachings of the present invention of an inkjet printer for housing an inkjet printhead having a non-uniformly thick lid laser welded with one of a compensation plate or compliant member.

Since the to-be-welded work pieces of the present invention can embody inkjet printhead lids and bodies, in FIGS. 7 and 8 we describe other functional aspects of an inkjet printhead and the printer that uses them. In particular, with reference to FIG. 7, a printhead of the present invention is shown generally as 101. The printhead 101 has a housing 121 formed of a body 161 and a non-uniformly thick lid 160 laser welded together with a compensation plate an&or a compliant member. Its housing shape varies and depends upon the external device that carries or contains the printhead. The housing has at least one compartments, internal thereto, for holding an initial or refillable supply of ink and a structure, such as a foam insert, lung or other, for maintaining appropriate backpressure in the inkjet printhead during use. In one embodiment, the internal compartment includes three chambers for containing three supplies of ink, especially cyan, magenta and yellow ink. In other embodiments, the compartment may contain black ink, photo-ink and/or plurals of cyan, magenta or yellow ink. It will be appreciated that fluid connections (not shown) may exist to connect the compartment(s) to a remote source of ink.

A portion 191 of a tape automated bond (TAB) circuit 201 adheres to one surface 181 of the housing while another portion 211 adheres to another surface 221. As shown, the two surfaces 181, 221 exist perpendicularly to one another about an edge 231.

The TAB circuit 201 has a plurality of input/output (I/O) connectors 241 fabricated thereon for electrically connecting a heater chip 251 to an external device, such as a printer, fax machine, copier, photo-printer, plotter, all-in-one, etc., during use. Pluralities of electrical conductors 261 exist on the TAB circuit 201 to electrically connect and short the I/O connectors 241 to the bond pads 281 of the heater chip 251 and various manufacturing techniques are known for facilitating such connections. It will be appreciated that while eight I/O connectors 241, eight electrical conductors 261 and eight bond pads 281 are shown, any number are embraced herein. It is also to be appreciated that such number of connectors, conductors and bond pads may not be equal to one another.

The heater chip 251 contains at least one ink via 321 that fluidly connects to a supply of ink internal to the housing. During printhead manufacturing, the heater chip 25 preferably attaches to the housing with any of a variety of adhesives, epoxies, etc. well known in the art. As shown, the heater chip contains four rows (rows A-row D) of heaters. For simplicity in this crowded figure, dots depict the heaters in the rows. It will be appreciated that the heaters of the heater chip preferably become formed as a series of thin film layers made via growth, deposition, masking, photolithography and/or etching or other processing steps. A nozzle plate with pluralities of nozzle holes, not shown, adheres over the heater chip such that the nozzle holes align with the heaters.

With reference to FIG. 8, an external device, in the form of an inkjet printer, for containing the printhead 101 is shown generally as 401. The printer 401 includes a carriage 421 having a plurality of slots 441 for containing one or more printheads. A latching mechanism (not shown) gets specifically configured to lockingly mate with the positive projections of the non-uniformly thick printhead lid. The carriage 421 is caused to reciprocate (via an output 591 of a controller 571) along a shaft 481 above a print zone 461 by a motive force supplied to a drive belt 501 as is well known in the art. The reciprocation of the carriage 421 is performed relative to a print medium, such as a sheet of paper 521, that is advanced in the printer 401 along a paper path from an input tray 541, through the print zone 461, to an output tray 561.

In the print zone, the carriage 421 reciprocates in the Reciprocating Direction generally perpendicularly to the paper Advance Direction as shown by the arrows. Ink drops from the printheads (FIG. 7) are caused to be ejected from the heater chip 251 at such times pursuant to commands of a printer microprocessor or other controller 571. The timing of the ink drop emissions corresponds to a pattern of pixels of the image being printed. Often times, such patterns are generated in devices electrically connected to the controller (via Ext. input) that are external to the printer such as a computer, a scanner, a camera, a visual display unit, a personal data assistant, or other.

To print or emit a single drop of ink, the heaters (the dots of rows A–D, FIG. 7) are uniquely addressed with a small amount of current to rapidly heat a small volume of ink. This causes the ink to vaporize in a local ink chamber and be ejected through, and projected by, a nozzle plate towards the print medium.

A control panel 581 having user selection interface 601 may also provide input 621 to the controller 571 to enable additional printer capabilities and robustness.

As described herein, the term inkjet printhead may in addition to thermal technology include piezoelectric technology, or other, and may embody a side-shooter structure instead of the head-shooter structure shown. Finally, since the to-be-welded work pieces described above may embody an inkjet printhead lid and body and since laser welding imparts essentially no vibratory motion in the work pieces, unlike ultrasonic welding, less cracking of the heater chip occurs and less air becomes entrained in the ink during printhead manufacturing.

Figure 9:
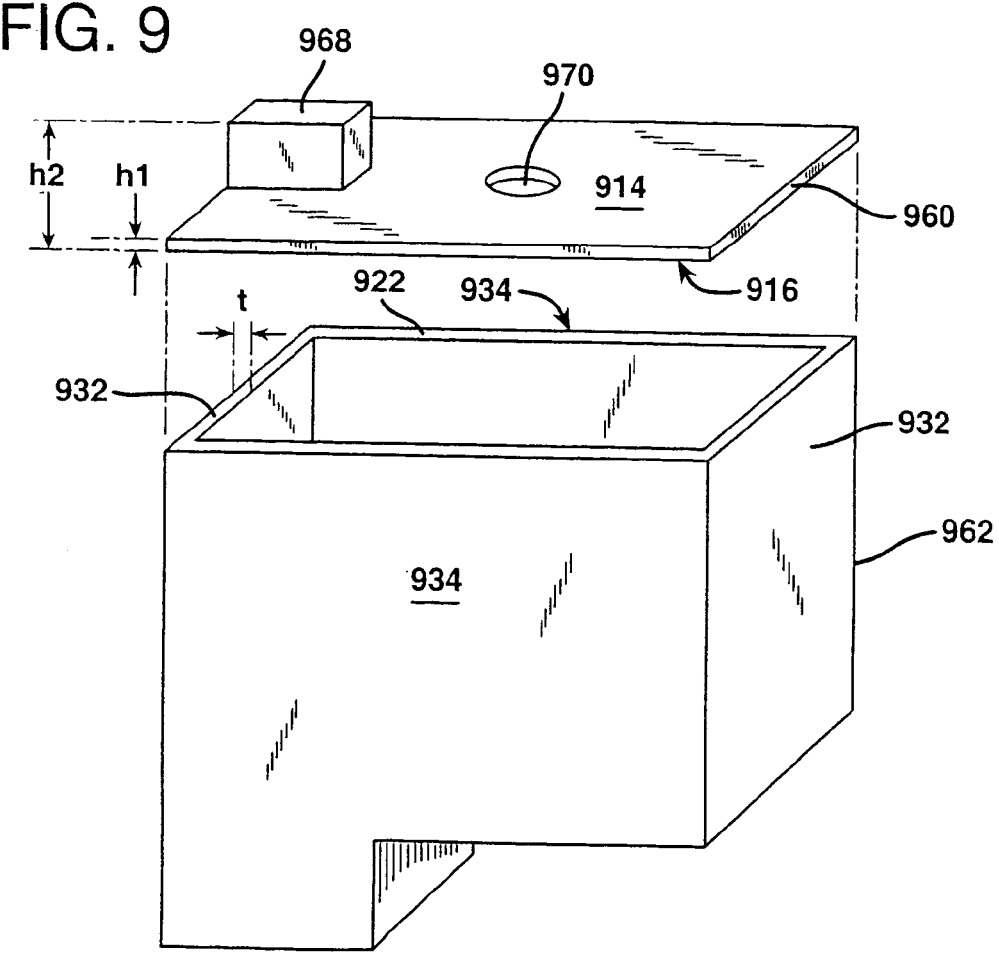
FIG. 9 is an exploded view in accordance with the teachings of the present invention of an inkjet printhead having a non-uniformly thick lid to-be-laser-welded to a printhead body with one of a compensation plate or compliant member.

With reference to FIG. 9, an inkjet printhead lid 960 becomes laser welded to an inkjet printhead body 962 with a compensation plate and/or a compliant member as previously described. The lid has an upper lid surface 914 and a lower lid surface 916 and embodies a non-uniformly thick lid as evidenced by different heights h1 and h2, wherein h1 represents a distance from the bottom lid surface 916 to the bottom of the positive projection 968 while h2 represents a distance from the bottom lid surface to a top of the positive projection. Although not shown with a height identifier like the positive projection, the lid also contains a negative void 970.

The body 962 has a body wall formed of two widthwise wall sections 932 and two lengthwise wall sections 934 and each have a wall thickness t, bearing in mind that the wall thicknesses of each wall section need not equal one another. When the lower lid surface 916 rests on an upper body surface 922, a weld interface forms in the region where the two (lower lid surface and upper body surface) touch one another. Such region comprises a perimeter of the body wall. In this figure, the lid has laser light transparency characteristics while the body has laser light absorbing characteristics. In still other configurations, the lid could be laser light absorbing while the body is laser light transparent.

The foregoing description is presented for purposes of illustration and description of the various aspects of the invention. The descriptions are not intended to be exhaustive or to limit the invention to the precise form disclosed. The embodiments described above were chosen to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally and equitably entitled.

What is claimed is:

1. An inkjet printhead, comprising:
    a lid substantially transparent to laser light having an upper and lower lid surface, the upper lid surface containing one of a positive projection and a negative void; and
    a body substantially opaque to laser light having an upper body surface laser welded to the lower lid surface at a weld interface.

2. The printhead of claim 1, wherein the weld interface includes a substantial entirety of a perimeter of a body wall.

3. The printhead of claim 1, wherein the lid has a composition of polyphenylene ether plus polystyrene.

4. The printhead of claim 1, wherein the lower lid surface is substantially flat.

5. The printhead of claim 1, wherein the lid is substantially transparent to said laser light at wavelengths of about 810 nm, of between about 630 nm to about 680 nm, of between about 940 nm to about 990 nm or 1064 nm.

6. An inkjet printhead, comprising:
    a lid substantially transparent to laser light having an upper and lower lid surface, the upper lid surface containing one of a positive projection and a negative void, the lower lid surface being substantially flat; and
    a body substantially opaque to laser light having a substantially flat body wall surface laser welded to the lower lid surface at a weld interface, the body wall surface being formed of two widthwise wall sections and two lengthwise wall sections that define a compartment for containing ink.

7. The printhead of claim 6, wherein one of the lid and body has a composition of polyphenylene ether plus polystyrene.

8. The printhead of claim 6, wherein the lid is substantially transparent to said laser light at wavelengths of about 810 nm, of between about 630 nm to about 680 nm, of between about 940 nm to about 990 nm or 1064 nm.

9. The printhead of claim 6, wherein the two widthwise and lengthwise wall sections each have a substantially uniform wall thickness.

10. The printhead of claim 6, wherein the weld interface includes a perimeter of the body wall.

11. The printhead of claim 6, wherein the positive projection is a keying structure.

12. The printhead of claim 6, wherein the lid is substantially uniformly thick between the upper and lower lid surfaces in regions other than where the one of the positive projection and the negative void exist.

13. An inkjet printhead, comprising:
    a lid substantially transparent to laser light having an upper and lower lid surface, the upper lid surface containing one of a positive projection and a negative void and the lower lid surface being substantially flat, the lid being substantially uniformly thick between the upper and lower lid surfaces in regions other than where the one of the positive projection and the negative void exist; and
    a body substantially opaque to laser light having a substantially flat body wall surface laser welded to the lower lid surface at a weld interface, the body wall surface being formed of two widthwise wall sections and two lengthwise wall sections that define a compartment for containing an initial supply of ink, the two widthwise and lengthwise wall sections having a substantially uniform wall thickness.

14. The printhead of claim 13, wherein one of the lid and body has a composition of polyphenylene ether plus polystyrene.

15. The printhead of claim 13, wherein the lid is substantially transparent to said laser light at wavelengths of about 810 nm, of between about 630 nm to about 680 nm, of between about 940 nm to about 990 nm or 1064 nm.

16. The printhead of claim 13, wherein the weld interface is substantially transverse to a direction of laser light during a welding process.

17. The printhead of claim 13, wherein the weld interface includes a perimeter of the body wall.

18. The printhead of claim 13, wherein the positive projection is a keying structure that mates with a cartridge carrier in an inkjet printer.

* * * * *